United States Patent Office 3,269,103
Patented August 30, 1966

3,269,103
DEVICE FOR ARRESTING A MULTIPLE TWIST SPINDLE
Gustav Franzen, Neersen, near Krefeld, Germany, assignor to Palitex Project-Company G.m.b.H., Krefeld, Germany, a company of Germany
Filed Dec. 15, 1964, Ser. No. 418,519
Claims priority, application Germany, Dec. 21, 1963, N 24,199
13 Claims. (Cl. 57—88)

The present invention relates to a device for arresting a multiple twist spindle.

An object of the invention is to provide a device for arresting a multiple twist spindle, e.g., a double twist spindle, in a predetermined angular position. This object may be achieved by first braking the spindle, for instance with an expanding shoe brake which engages when a control lever is deflected from its operational position prior to the spindle being brought to the predetermined stop position by an arresting means. The spindle may be stopped and released again by further deflection of the control lever to permit the spindle briefly to restart and then be stopped by the arresting means at the predetermined position before it again gathers substantial momentum. The arresting means are arranged to stop the spindle in the required position.

In accordance with this invention it is now proposed to provide magnetic arresting means, e.g., comprising at least one magnet, preferably a permanent magnet. The advantage of this proposal is that the means for arresting the spindle in a predetermined angular position creates no friction and resultant wear. Moreover, an arrangement of such a kind is smoother and less liable to faults in operation to which mechanical arresting means are liable of causing trouble by jamming, fouling or the like.

The magnet may be coupled with the brake and arranged to co-operate with a rotating part of the spindle. This rotating part, particularly the wharve, may be fitted with a permanent magnet, preferably in the form of a pole wheel. Alternatively, the rotating part, such as the wharve, may simply be provided with a soft iron member.

The permanent magnet coupled with the braking mechanism may be moved into and out of arresting position by raising and lowering it parallel to the spindle axis or by swivel motion.

Another possibility consists in using a permanent magnet that can be activated and inactivated by a switching lever coupled with the braking mechanism.

An electro-magnet may be used instead of a permanent magnet. Such an electro-magnet may be mechanically or electrically coupled to the brake mechanism.

Preferred embodiments of the invention are illustrated in the drawings in which

Figure 1:
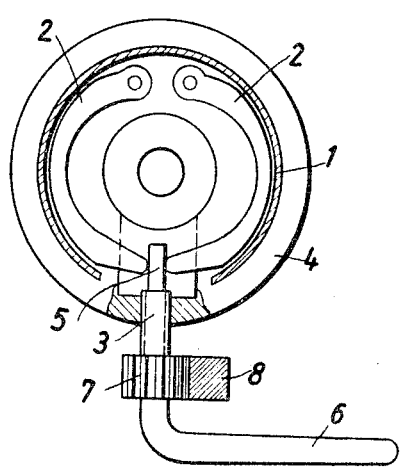
FIG. 1 is a horizontal section of the wharve showing the brake.
Figure 3:
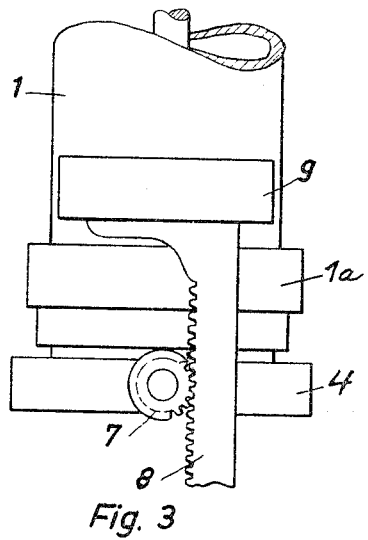
FIG. 3 is a front view of the spindle.
Figure 2:
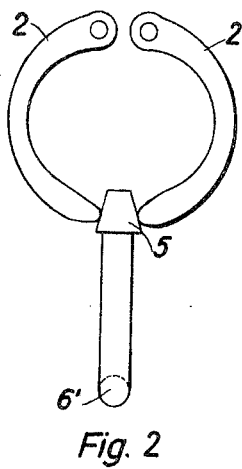
FIG. 2 illustrates the brake actuating lever in one position.
Figure 4:
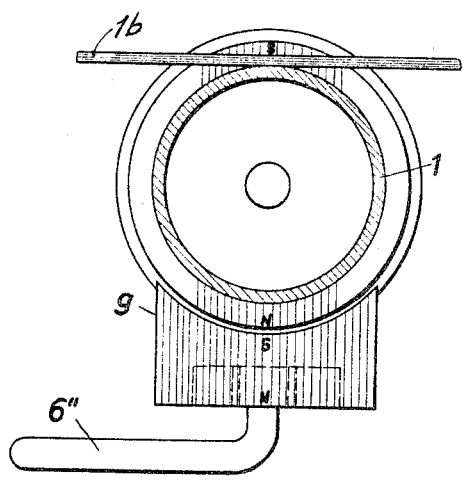
FIG. 4 is a horizontal section of the spindle.
Figure 5:
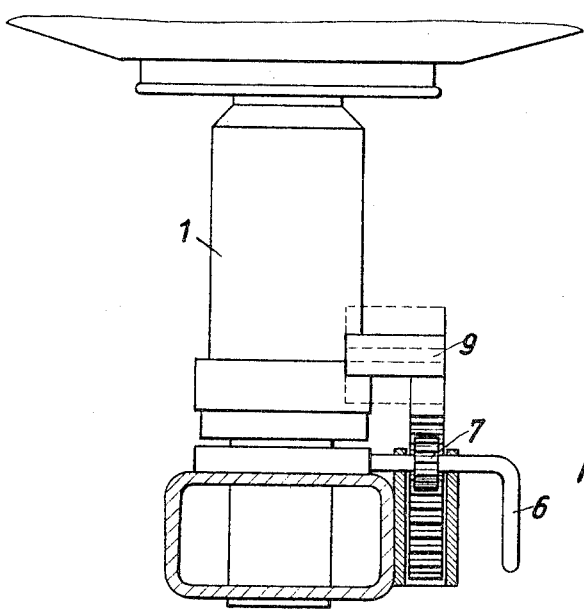
FIG. 5 is a side view of this embodiment of the invention.

The wharve 1 is hollow and in its interior contains two brake shoes 2 actuable by a lever 3 which projects into the spindle through a stationary ring 4. Lever 3 has a wedge-shaped head 5 by means of which the brake shoes can be expanded. When the control arm is in position 6 the brake shoes are released whereas in the position 6' shown in FIG. 2 they are expanded and grip. In position 6" of the control arm according to FIG. 4 the brake shoes 2 are released again. The actuating lever 3 carries a pinion 7 which meshes with a rack 8. In the embodiment shown in FIGS. 3 and 5 the upper end of the rack carries a permanent magnet 9 which is raised and lowered by the rack when arm 6 of the actuating lever 3 is turned into its different control positions. The magnet 9 may be brought into co-operation with a co-operating part of the wharve to arrest the spindle and this co-operating part may comprise a permanent magnet disposed in the ring 1a (or a soft iron member). The wharve 1 may be driven by the endless band 1b in conventional manner.

Figure 6:
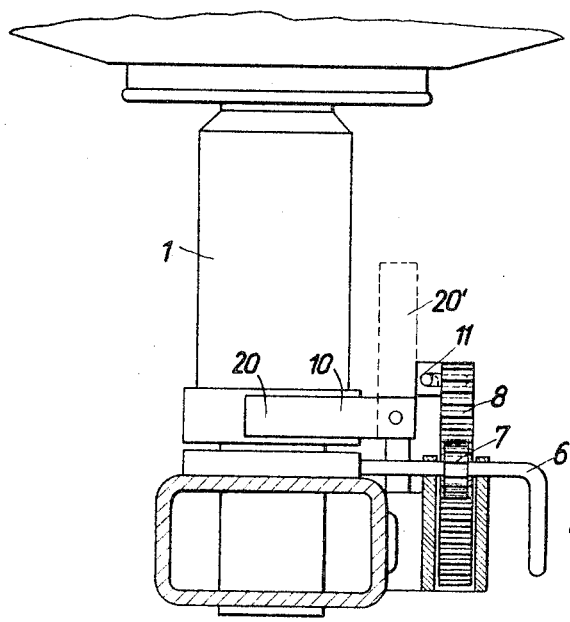
FIG. 6 is a side view of another embodiment.

In FIGURE 6 a swivelling magnet 10 deflectable by the rack through a slot and pin linkage 11 is provided. In either case the arrangement is always such that the permanent magnet 9 or 10 is in operative position when the brake shoes 2 have released the spindle after having engaged and initially braked the same.

Figure 7:
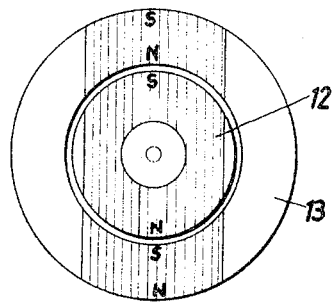
FIGS. 7 to 10 illustrate different dispositions and shapes of magnet according to the invention.
Figure 8:
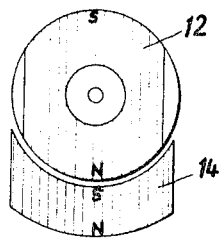

In the embodiment according to FIGURE 7 the wharve carries a permanent magnet 12 with two pronounced poles. This magnet co-operates with an annular member 13 which is radially magnetised in such a way that a north and a south pole are induced at two specific points. Alternatively, and as illustrated in FIG. 8, the provision of a permanent magnet 14 constituting only the segment of an annulus and likewise radially magnetised, would be sufficient. The annular member 13 or the segment magnet 14 may be movable axially of the spindle in the manner aforesaid.

Figure 9:
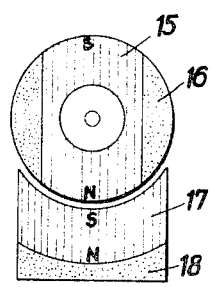
Figure 10:
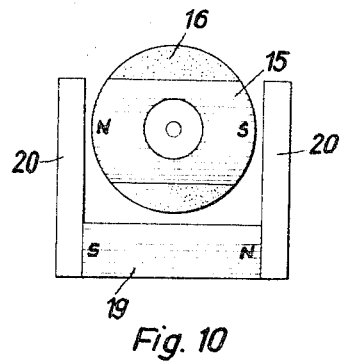

In FIGS. 9 and 10 the wharve is provided with a bar magnet 15 embedded in a non-magnetic material 16. In FIG. 9 the bar magnet is arranged to co-operate with a magnet 17 in the form of an annular segment 17 attached to a non-ferromagnetic holder 18, the magnet 17 being displaceable parallel to the axis of the spindle as aforesaid. The embodiment according to FIG. 10 is that used in the arrangement of the magnets in FIG. 6. A bar magnet 19 has pole shoes 20 which are moved into arresting position by swivel motion from the dotted outline position 20' into position 20 in FIG. 6, i.e., the arms 20 can be swung into or out of position alongside the wharve, the pivot axis being in the region of the bar magnet 19.

In each of these several cases the wharve, after having been braked initially and then released again for brief rotation, is finally retained in the angular position determined by the magnet 9, 13, 14, 17, 19/20.

Figure 11:
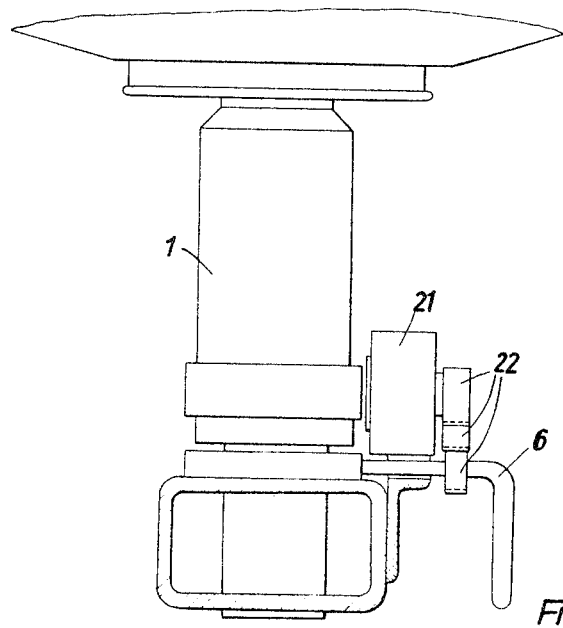
FIGS. 11 and 12 are side views of two more embodiments.

It is known that permanent magnets can be activated and inactivated for instance by rotating them out of and into a position in which they are magnetically short-circuited across their pole shoes. In an arrangement making use of this facility the activating switch means of the permanent magnet can be coupled with the actuating lever for the braking mechanism and both the braking action and the magnetic arresting action thus controlled. A side elevation of such an arrangement is illustrated in FIG. 11. The permanent magnet which can be activated and inactivated is indicated at 21. In this example the permanent magnet is of the rotatable kind coupled with the control arm 6 by a train of pinions 22.

Figure 12:
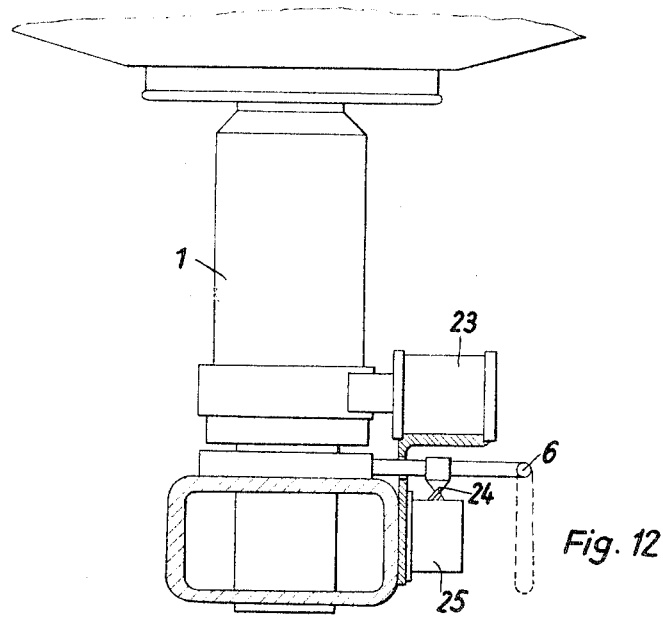

FIG. 12 shows an otherwise similar form of construction to that in FIG. 11 excepting that an electro-magnet 23 is used and electrically connected to the control arm 6 by contact means 24 and 25.

What I claim is:

1. A device for stopping a multiple twist spindle in a predetermined angular position, comprising means for initially braking the rotation of the spindle, control means for operating said braking means and magnetic means for bringing the spindle to a standstill in a predetermined position and operative in response to further movement of said control means after initial braking.

2. A device for stopping a multiple twist spindle in a predetermined angular position, comprising braking means for initially stopping the spindle, a deflectable control member for operating said means; said member being operable by further deflection to release the spindle again for rotation and magnetic means operable in response to said further deflection of said control member to co-operate with said spindle to bring the spindle to rest at said predetermined angular position.

3. In combination with a multiple twist spindle and means for rotating said spindle, a device for stopping the said spindle in a predetermined angular position, said device comprising means for initially braking the rotation of said spindle, and a control member therefor, said control member being operative to release the braking means for further rotation of the spindle by said rotating means and magnetic means operable in response to movement of the said control member for bringing the spindle to rest at a predetermined angular position.

4. A device according to claim 1, in which said magneitc means comprises at least one permanent magnet.

5. A device according to claim 1, in which said magnetic means co-operate with the wharve of said spindle.

6. A device according to claim 1, said magnetic means comprising a permanent magnet adapted to be activated and inactivated and a member coupled to the said braking means for controlling the activation and inactivation of the said magnet.

7. A device according to claim 1, said magnetic means comprising an electro-magnet and switch means responsive to actuation of the braking means for energising the said electro-magnet.

8. A device for stopping a multiple twist spindle in a predetermined angular position, comprising means for initially braking the rotation of the spindle and magnetic means for bringing the spindle to a standstill in a predetermined position, said magnetic means comprising a magnet coupled with the said braking means and adapted to co-operate with a rotating part of the spindle.

9. A device for stopping a multiple twist spindle in a predetermined angular position, comprising means for initially braking the rotation of the spindle and magnetic means for bringing the spindle to a standstill in a predetermined position, said magnetic means comprising a magnet coupled with the said braking means and adapted to co-operate with a rotating part of the spindle, the said rotating part comprising a permanent magnet with which said first magnet co-operates.

10. A device for stopping a multiple twist spindle in a predetermined angular position, comprising means for intially brakng the rotation of the spindle and magnetic means for bringing the spindle to a standstill in a predetermined position, said magnetic means comprising a magnet coupled with the said braking means and adapted to co-operate with a rotating part of the spindle, the said rotating part comprising a soft iron member with which said magnet co-operates.

11. A device for stopping a multiple twist spindle in a predetermined angular position, comprising means for initially braking the rotation of the spindle and magnetic means for bringing the spindle to a standstill in a predetermined position, said magnetic means comprising a magnet coupled with the said braking means and adapted to co-operate with a rotating part of the spindle, said rotating part being fitted with a permanent magnet in the form of a pole wheel.

12. A device for stopping a multiple twist spindle in a predetermined angular position, comprising means for initially braking the rotation of the spindle and magnetic means for bringing the said spindle to a standstill in a predetermined position, said magnetic means comprising a permanent magnet, means coupling the said magnet with the said braking means, said coupling means being operative to move said permanent magnet into and out of arresting position by raising and lowering the said magnet parallel to the spindle axis.

13. A device for stopping a multiple twist spindle in a predetermined angular position, comprising means for initially braking the rotation of the spindle and magnetic means for bringing the said spindle to a standstill in a predetermined position, said magnetic means comprising a permanent magnet, means coupling said magnet with the said braking means, said coupling means being operative to swivel said permanent magnet into and out of arresting position.

References Cited by the Examiner
UNITED STATES PATENTS

| | | | |
|---|---|---|---|
| 2,518,491 | 8/1950 | Pfeffer et al. | 57—88 |
| 2,563,641 | 8/1951 | Colombu et al. | 57—88 |

FRANK J. COHEN, *Primary Examiner.*

STANLEY N. GILREATH, *Examiner.*

J. PETRAKES, *Assistant Examiner.*